Feb. 19, 1957   T. F. WORTH   2,782,327
DYNAMOELECTRIC MACHINE
Filed Oct. 27, 1954

Inventor:
Thomas F. Worth,
by Claude N. Mott
His Attorney.

United States Patent Office 2,782,327
Patented Feb. 19, 1957

2,782,327

DYNAMOELECTRIC MACHINE

Thomas F. Worth, Lynn, Mass., assignor to General Electric Company, a corporation of New York Application October 27, 1954, Serial No. 465,105

5 Claims. (Cl. 310—59)

This invention relates to dynamoelectric machines and has particular significance in connection with so-called open type alternating current induction motors.

Heretofore there has been a cooling problem in connection with design of alternating current dynamoelectric machines characterized by having distributed windings on both the rotor and stator so that there are no salient poles between which ventilating medium may flow. Sufficient cooling medium can not generally be forced through the small air gap between rotor and stator, and therefore reliance must be made upon ducts or passageways through one or more of the core members, or passageways must be provided outside the outer periphery of the stator core but this necessitates a larger size machine than is usually desired or leads to problems connected with (1) heat transfer through an outer frame, (2) strength and rigidity of the feet and lower frame structure, (3) strength of the frame in compression during machining or other fabrication, and (4) the adaptability of the frame to screening or totally enclosing so that the motor may be convertible to a screened, totally enclosed, or splash-proof type as well as an open motor.

It is an object of the present invention to provide simple and inexpensive means for overcoming the above-mentioned difficulties.

A further object is to provide a dynamoelectric machine having smaller outline dimensions for a given effective cooling capacity and mechanical strength of the frame and also provides protection against the entrance of particles, such as dirt and water, into the machine when the machine is ceiling mounted or wall mounted.

In the illustrated embodiment of the invention, these and other objects are met by providing, as for an open type A. C. induction motor, usual appurtenances but including an outer central frame spaced from while following the arcuate contour of the stator core around a top portion and having depending sides which terminate in corner feet. Between the feet, a curved web plate portion forms an integral part of the frame and holds the bottom of the core, and at the top portion axially extending ribs separate frame and core, with passages provided through at least some of the ribs so that ventilating medium may flow over the core between and through these ribs. As shown in the drawing there are three ribs located in the top portion of the machine and engaging the stator core to hold it downward in intimate contact with the web plate base. At least the outer two of the ribs are cut away at their centers to allow the ventilating medium to pass peripherally around to the sides of the motor and emerge adjacent the base portion on either side of the bottom web support for the stator core. This arrangement provides increased contact between the frame and the core particularly at the large area of the web between the feet at the bottom so that heat may be readily transferred out of the feet and away from the machine through the mounting base of the machine. Also, with the arrangement it is very easy to provide louvres formed integrally with the frame above side exits to make the motor splash-proof and to provide four short parallel ventilating medium paths around the frame. Such louvres may be easily machined to have the same internal dimensions as the top supporting ribs, and the core supporting web base to further increase the heat conducting connection between the core and the frame and to increase the area over which the ventilating medium extracts air in passing through the machine.

Many other objects and advantages will become apparent and the invention may be better understood from consideration of the following description taken in connection with the accompanying drawing, in which.

Figure 1:
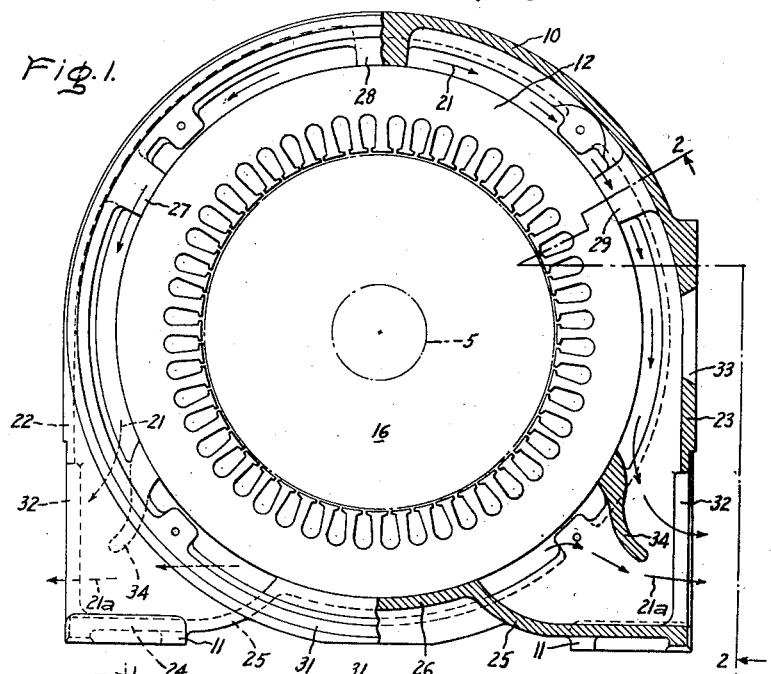
Fig. 1 is a cross sectional view, along line 1—1 of Fig. 2, of frame and stator core portions of an open type A. C. induction motor embodying the invention.
Figure 2:
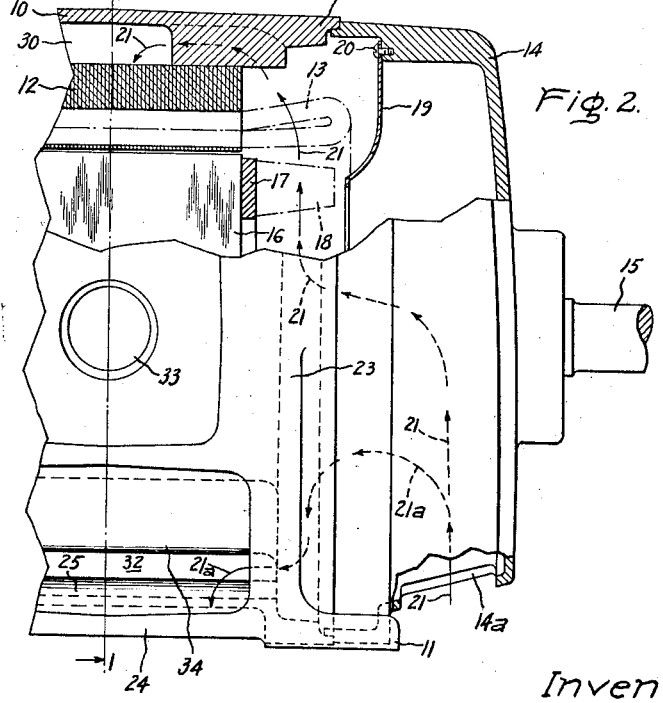
Fig. 2 is an elevational view, partly in section, along line 2—2 of Fig. 1, and showing one end of a machine having a frame and stator core as in Fig. 1. It may be assumed that the opposite end is the same, except oppositely hand.

I have shown in Figs. 1 and 2 my invention in connection with a squirrel cage induction motor which includes a stationary central cast yoke or frame 10 provided with feet 11. As hereafter more fully described, the frame 10 has longitudinal ribs supporting a magnetic material stator core 12 formed of annular laminations and which may be provided with a conventional stator winding as indicated by the dashed lines at 13 in Fig. 2. The stator also includes end bells, of which one is shown at 14 (Fig. 2) and each of the end bells is adapted to hold a conventional bearing (not shown) for supporting one end of a rotatable shaft 15.

The rotor of the machine includes a magnetic core 16 of laminated construction and which may be provided with a conventional cast squirrel cage winding 17 and conventional integrally cast rotor fan blades shown dotted at 18 (Fig. 2). The rotor core 16 is, of course, supported by the shaft 15 and arranged to react electrodynamically with the stator core 12 and, during operation, rotor fan blades 18 (at each end of the machine) draw air in toward their centers through an arcuate opening defined around the shaft by an annular baffle plate 19 secured as by screws (of which one is shown at 20) to an inner flange of the end bell 14. In order to supply air thus drawn in by the fan, end bell 14 is provided with a rectangular opening 14a in the lower quadrant thereof so that outside air may be drawn therethrough (as indicated by the arrows 21) without danger of falling objects, rain water and the like entering this opening. If it is desired to mount the machine on a wall or ceiling, the end bells 14 may be rotated from the normal position shown in Fig. 2 to a position in which openings 14a are directed downwardly.

As shown in the drawing, the motor is provided with four feet 11, formed integrally with the frame at the corners of depending sides 22, 23 and at each side of the motor between the respective fore and aft feet 11 there is provided a raised portion or web plate 24 which curves upward at 25—25 and downward at 26 to form a stator core supporting base providing contact with the stator core 12 over an enlarged area to conduct heat therefrom to feet 11. The assembled punchings of stator core 12 are held downward against base portion 26 by a plurality of three circumferentially spaced ribs 27, 28 and 29, respectively, all located in the top half of and formed as an integral part of the machine frame 10. For a purpose which may become more apparent as the description proceeds, at least the two outer ribs 27 and 29 are notched at their axial centers at 30 (see Fig. 2) to provide a path for the flow of ventilating medium between opposite sides of the rib. The middle rib 28 is preferably unnotched for a greater area of contact with the punchings at this mid point (see Fig. 1), and to establish parallel ventilating medium paths as hereafter explained.

Thus the frame is formed as a unitary cast member having annular end bell receiving flanges 31 and a central portion in the shape of a closed inverted U in cross section and having a top arcuate sector following the arcuate curvature of the core around substantially 180° and providing a plurality of inwardly directed ribs contacting the core within the sector thus defined, while straight side portions 22 and 23 depend from said sector to form depending hollow legs terminating in a transverse base portion which closes the frame at the base and provides a middle web 26 contacting the core through a substantial arc to support the core and aid in transferring heat therefrom.

Generally rectangular air exhaust openings 32 are provided centrally of each side of the motor in the straight portions 22 and 23 above the web plate 24. A junction box opening 33 is shown provided at one side for the motor leads (not shown) but of course in operation this last mentioned opening will usually be substantially sealed so far as ventilating medium is concerned.

A pair of louvres 34 cast integral with frame 10 and located one at each side of the motor in a bottom quadrant thereof and each is machined to the same internal diameter as the supporting ribs and aid in cooling as hereafter explained. As best seen in Fig. 1, louvres 34 terminate inwardly from openings 32 so that the solid plugs or screens may be easily installed to convert the motor to a screened or enclosed type. Integral louvres 34 additionally serve to mechanically reinforce the hollow legs of the frame for added rigidity and strength.

In operation the machine is ventilated from both ends with fans 18 drawing air into the machine through the openings 14a and through the annular baffle 19. The air then passes over the stator winding 13 as shown by arrows 21, and axially towards the center of the machine between the frame 10 and core 12, then circumferentially around core 12 through the slots 30 in the side ribs 27 and 29, respectively, from which it is exhausted from the machine after passing over the upper surface of louvre 33 and 34, respectively, and through the respective opening 32. Meanwhile, parallel bottom paths 21a are provided through fan 18, then axially between the respective louvre 34 and the core supporting base portion 26 towards the center of the machine and then radially outward over the bottom side of the respective louvre 34 and then out the opening 32. The arrangement described is a very efficient one since the louvres which make the motor drip-proof are in contact with the stator core, as well as in the air path, and materially increase the area from which the cooling air can pick up heat from the stator core. Also, the base portion 26 is in intimate contact with the stator mechanically over a large area, and is of course also in contact mechanically with the feet 11 and thus in good heat conducting relation to the supporting base to which the feet are bolted. This also materially aids in cooling by increasing the amount of heat which can be taken from the machine. While the ventilating paths have been described for the air entering one end of the machine only, it is readily apparent that the same cooling arrangement can be provided for both ends.

Additionally, the structure of the invention allows the feet of the frame to be materially shorter than feet on more conventional constructions, so that the machine shaft line is lower to the base, the machine is less expensive to make, uses less materials, and is more efficient in proportion to its weight. Also, the frame between the feet is solid and this affords great strength in compression. Thus, the boxed-in design of the solid base adds increased strength in compression when the frame is mounted during manufacture for machining the inside periphery of the core supporting portions such as base 26, louvres 34, and ribs 27, 28 and 29 to reduce the deformation of the frame 10 during the machining operations to produce a more accurate bore in the finished frame.

Those skilled in the art will also appreciate that arrangements of the invention make a motor or generator much easier to screen as compared to more conventional constructions, and, also make it easy to convert the machine to a totally enclosed motor or generator by merely interconnecting the openings 32 with the close-by openings 14a.

There is thus provided a device of the character described capable of meeting the objects above set forth. While particular embodiments have been illustrated and described, various modifications may obviously be made without departing from the true spirit and scope of the invention which I intend to define in the appended claims.

What I claim as new and desire to secure by Letters Patent of the United States is:

1. In a dynamoelectric machine, an axially central annular magnetic material stator core portion, and an axially central frame comprising a unitary cast member following the arcuate curvature of the core around substantially 180° and having a plurality of inwardly depending ribs arranged to contact the core within the sector thus defined, said frame having straight side portions depending from said sector to form depending hollow legs with ventilating medium openings therethrough and terminating in a transverse base having integrally formed corner feet and including a middle web portion between the feet and arranged to close the base and contact the core through a substantial arc to support the core and aid in transferring heat therefrom.

2. In a dynamoelectric machine, the arrangement as in claim 1 further characterized by having integrally formed louvres within the depending hollow legs and further characterized by the web portion curving upwardly to and then downwardly beneath the core.

3. A dynamoelectric machine having a stator core of magnetic material, a central hollow frame surrounding said core and terminating at each end in an annular end bell receiving flange and centrally thereof comprising a top arcuate portion terminating in downwardly extending straight sides forming hollow legs terminating in corner feet, a base portion curving upwardly from the feet at each side and then downwardly at the center to support a bottom portion of the core, the frame being cut away through each side above said base portion to provide ventilating medium exit openings, a plurality of ribs extending radially inward from the top arcuate portion to hold the upper portion of the core with at least some of the ribs being slotted to allow ventilating medium to flow therethrough, and an end bell and fan and baffle means at each end of the frame for directing ventilating medium over the core between the ribs, thence around and through the rib slots, and out of the machine through said exit openings.

4. A squirrel cage induction motor having an annular stator core, an axially central outer frame formed as an integral hollow member with an arcuate top portion having three circumferentially spaced radially inwardly axially extending ribs machined to an inner diameter to hold said core with the centermost of said ribs being solid and the others of said ribs being slotted to permit ventilating medium to pass from one side thereof to the other, said frame having straight sides depending from said arcuate top portion to provide hollow legs terminating in corner feet with a base web extending fore and aft between the feet and transversely from each side pair of feet arcuately upwardly then arcuately downwardly to provide a central arcuate base portion machined to the same inner diameter as the ribs to support said annular stator core seated on said arcuate base portion and held thereon by said axially extending ribs at the top, said frame having a pair of louvres formed integral therewith and located one in each hollow leg of the motor and each machined to the same internal diameter as the ribs to be in heat conducting and mechanically supporting contact with said core, said depending sides each having a ventilating medium exhaust opening therethrough adjacent the respective louvre and above the base web, a distributed type stator winding within and around the stator core, a pair of end bells secured one to each end of the frame, each of said end bells having an opening in its bottom through which ventilating medium may be drawn and each having an arcuate baffle plate secured to an inner side thereof for directing ventilating medium axially and centrally of the respective bell, and each of said end bells having means for supporting a shaft portion, a shaft supported by the associated end bell shaft portion supporting means, a rotor core secured to be rotatable with the shaft and to cooperate electrodynamically with the stator core and having a cast squirrel cage winding, and at each end of the rotor winding fan blades arranged to draw air in through the respective end bell baffle plate and discharge it over the stator winding and core and between stator core and frame between the ribs, between the ribs and louvres, and between the louvres and core supporting arcuate base portion.

5. In a dynamoelectric machine, the combination of a rotor having a winding and fan blades on each end thereof, an arcuately formed stator having a distributed winding and arranged to react electrodynamically with said rotor core, an outer central frame spaced from said stator core by a solid top rib and notched ribs on either side thereof, said frame comprising depending straight sides merging into a base member arranged for supporting said stator core in said frame and for providing structural strength to said frame, a pair of oppositely disposed louvres on said frame each having one end in contact with said stator core and the other ends respectively positioned adjacent ventilating air exits provided in each of said straight sides, and an end bell and baffle means attached to said frame for providing an air inlet to said fan blades for circulating air past said notched ribs and between the outer peripheral surface of said stator core and the inner peripheral surface of said frame prior to discharge from said exits.

References Cited in the file of this patent
UNITED STATES PATENTS

| | | |
|---|---|---|
| 1,961,387 | Pfleger | June 5, 1934 |
| 2,353,235 | Hamilton | July 11, 1944 |
| 2,454,180 | Johns | Nov. 16, 1948 |